United States Patent [11] 3,587,194

| [72] | Inventor | Jerry C. Brown Sacramento, Calif. |
|---|---|---|
| [21] | Appl. No. | 749,671 |
| [22] | Filed | Aug. 2, 1968 |
| [45] | Patented | June 28, 1971 |
| [73] | Assignee | Champion Corporation, Hammond, Ind. |

[54] TAP CUTTER
3 Claims, 4 Drawing Figs.

[52] U.S. Cl. .................................................... 51/241,
15/104, 166/55, 51/332
[51] Int. Cl. ....................................................... B24b 19/00
[50] Field of Search ............................................ 15/104.16,
104.06; 51/241, 241 (S), 241.1, 332; 166/55.7,
55.8, (Inquired)

[56] References Cited
UNITED STATES PATENTS
1,358,818   1920   Bering ........................... 166/55.7

| 1,791,382 | 1931 | Schafer ......................... | 51/241.5 |
| 2,203,011 | 1940 | Ellis .............................. | 166/55.7 |
| 2,280,769 | 1942 | Page .............................. | 51/332 |
| 3,164,062 | 1965 | Hogden ........................ | 144/205 |

*Primary Examiner*—William R. Armstrong
*Attorney*—Gregg & Hendricson

ABSTRACT: A tap cutter comprising a frame or housing with inflatable sleeves around the housing which are expanded by pneumatic pressure to lock it in place frictionally in a selected position within a sewer, drainage line, or the like, a rotating cutter driven by a pneumatic motor and a piston for moving the cutter axially of the pipe through a predetermined stroke. The expansible locking means, the pneumatic motor and the piston are connected by ducts from a source of pressure fluid. A signal device may be provided to indicate when the stroke of the piston is completed.

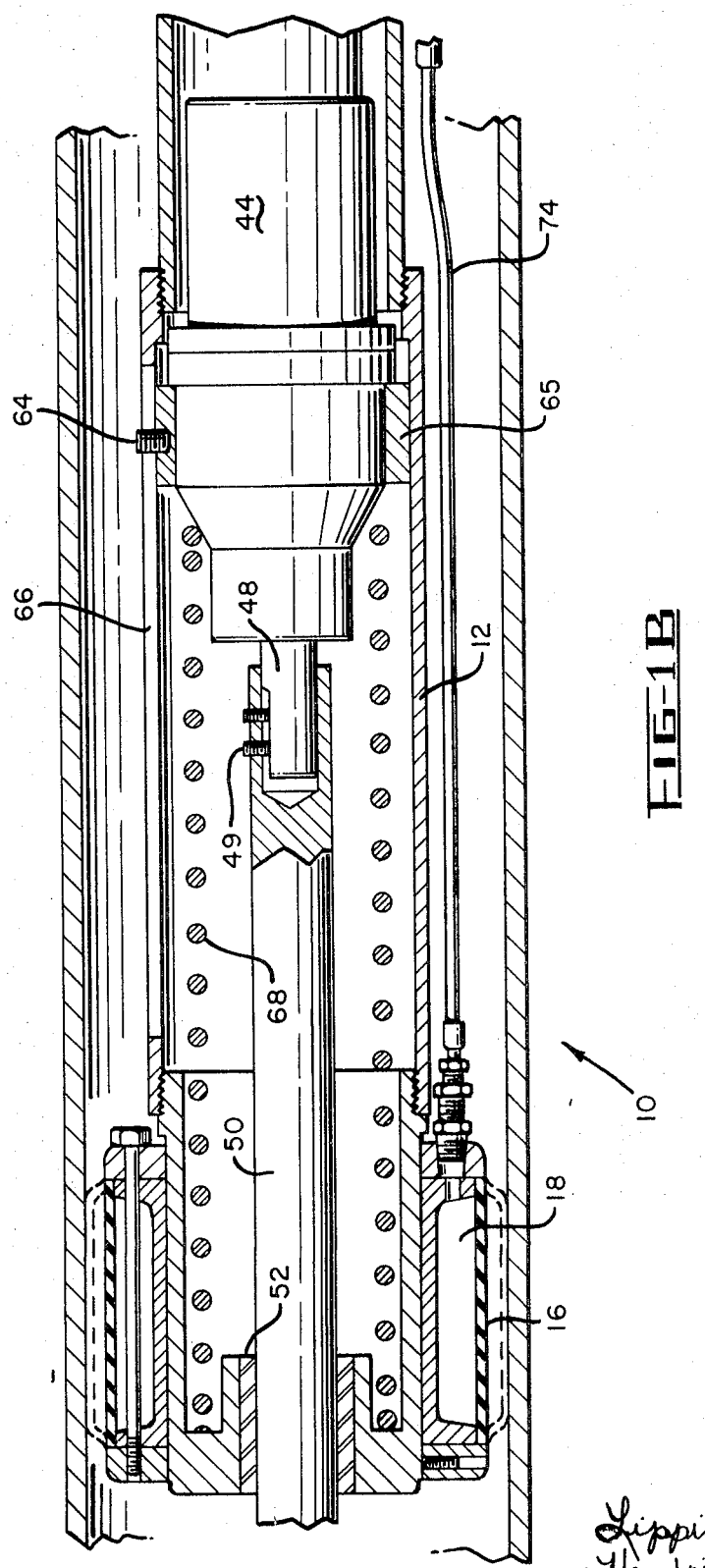

INVENTOR.
JERRY C. BROWN
BY Lippincott, Gregg, Hendrieson & Stidham
ATTORNEYS

TAP CUTTER

This invention relates to a tap cutter and, more particularly, to a tap cutter which may be secured in a predetermined position within a sewer line or other fluid conduit with a cutting device that is rotated and moves along the conduit through a predetermined stroke.

Conventionally, sewer mains are placed along streets and highways below the surfaces thereof with access to the sewer mains being gained by means of vertical conduits referred to as "manholes." Such sewer mains are generally of 6- or 8-inch diameter with manholes spaced at regular intervals of, say 400 feet apart.

According to present building codes, when a sewer line from a residence or other building is tapped into the sewer main the connection must be made according to certain prescribed standards with no portion of the tap line extending into the sewer main. However, prior to the adoption of such codes just a few years ago, plumbing subcontractors were interested primarily in making such tap connections by whichever means or method was most expeditious. Conventionally, the subcontractor merely broke an opening into the sewer main (which was commonly of ceramic material); he inserted the tap line through the opening so that it protruded into the main; and then he sealed any space around the opening with cement or other material to seal it off. Such tap connections were satisfactory for most purposes, but the protruding portions of the pipeline constituted a trap for leaves, roots, and other debris which could build up to clog or at least seriously impair the flow capacity of the sewer main.

It is therefore, an object of this invention to provide a device which will cut away the protruding portions of tap lines extending into sewer mains.

It is a further object of this invention to provide a device for cutting impedimenta from a sewer main, which device is short enough to be inserted into the line through a manhole.

It is a further object of this invention to provide a device for cutting impedimenta from a sewer main, which device may be locked in place in a selected position in the main while a cutting device is rotated and moved along the main through a predetermined stroke.

In carrying out this device, there is provided a frame or housing in which is carried a pneumatically driven motor for driving a rotating cutting device. The frame or housing is moved along the sewer main until an impediment is encountered and is there locked in place by expansible sleeves which are carried on the housing and expanded into frictional engagement with the inner surface of the sewer main. Then, after the cutting device is rotated, it is moved relative to the housing and along the main by means of a piston which pushes the motor within the housing. A switch device may operate a signal light when the stroke of the piston is completed. The expansible sleeve locking devices, the pneumatic motor and the piston may all be driven from a single source of pressure fluid.

Other objects and advantages of this invention will become apparent from the description following, when read in conjunction with the accompanying drawings wherein:

FIG. 1B is a section view of the housing with rotary motor embodying other features of this invention;

Figure 1A:
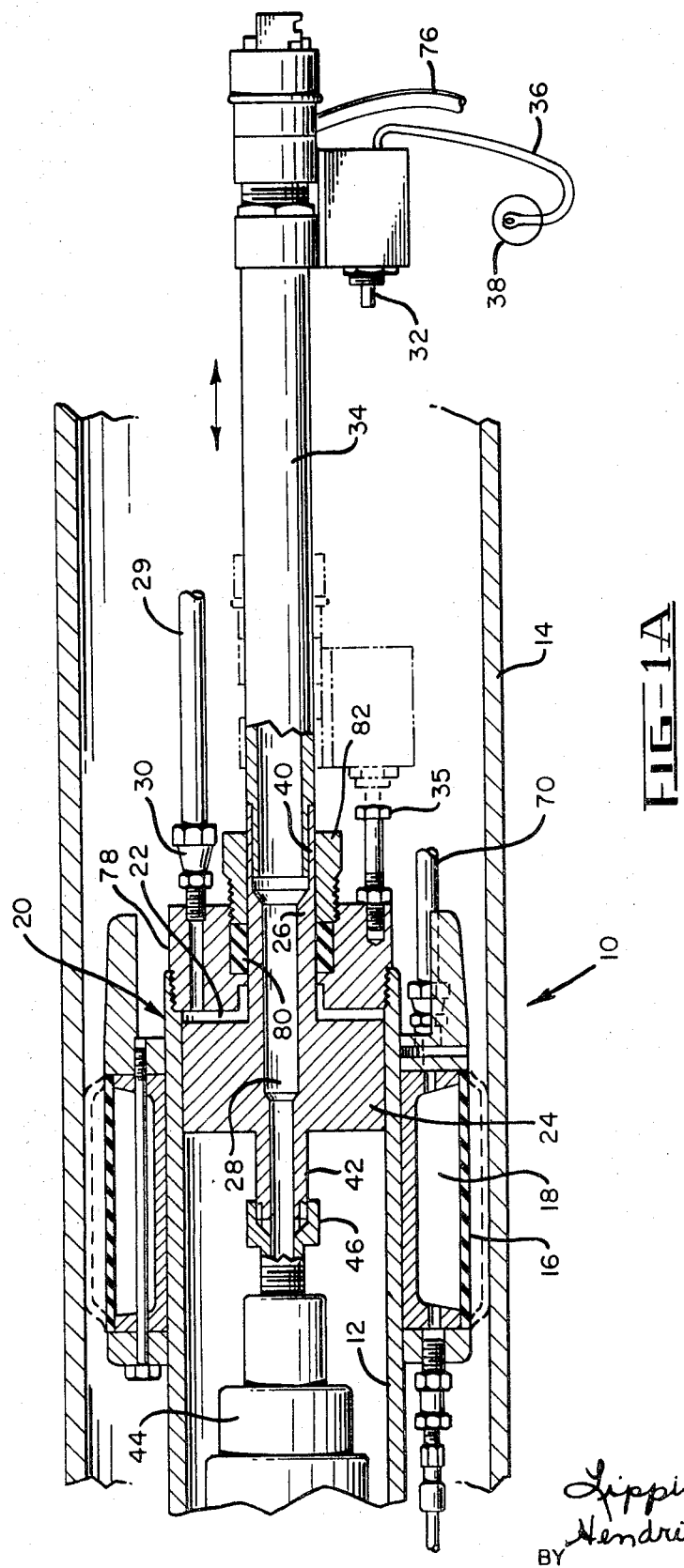
FIG. 1A is a view partially in vertical section showing one end of a device embodying features of this invention.

Referring now more particularly to FIG. 1A, the tap cutter 10 of this invention comprises a frame of housing 12 which may be anchored with a sewer main 14 by means of expansible sleeves 16 (FIGS. 1A and 1B) which may be expanded into frictional engagement with the inner surface of the sewer main. The expansile sleeves 16 form the cylindrical outer walls of annular fluid chambers 18 which may be welded or otherwise secured around the housing 12. When the sleeves are expanded as shown in phantom they grip the inner surface of the sewer main 14 to anchor the tap cutter 10.

Once the housing 12 is anchored the cutting tool hereinafter to be described is moved through the main by a linear drive assembly 20 which includes a pneumatic or other pressure fluid, a cylinder portion 22 in which is slidably carried a piston 24 from which there is extended a hollow piston rod 26 forming a central fluid passageway 28. This piston is forced toward the left in FIG. 1A by introduction of a pressure fluid, such as compressed air through a suitable duct 29 and through the fitting 30. A switch 32 carried on a tubular extension 34 of the piston rod 26 is preferably provided to engage an adjustable stop 35 on the housing 12, as shown in phantom, to complete an electrical circuit 36 and energize a suitable signal device such as a lamp 38 to indicate when the stroke is complete. The piston rod extension 34 may be removed at 40 if the manhole (not shown) is of a small enough diameter to require it.

The passageway 28 through the extension 34, the piston rod 26 and a forward extension 42 of the piston 24 supplied pressure fluid to a rotary pneumatic motor 44 which is secured to the forward extension 42 of the piston as by means of a threaded coupling 46.

Figure 1C:
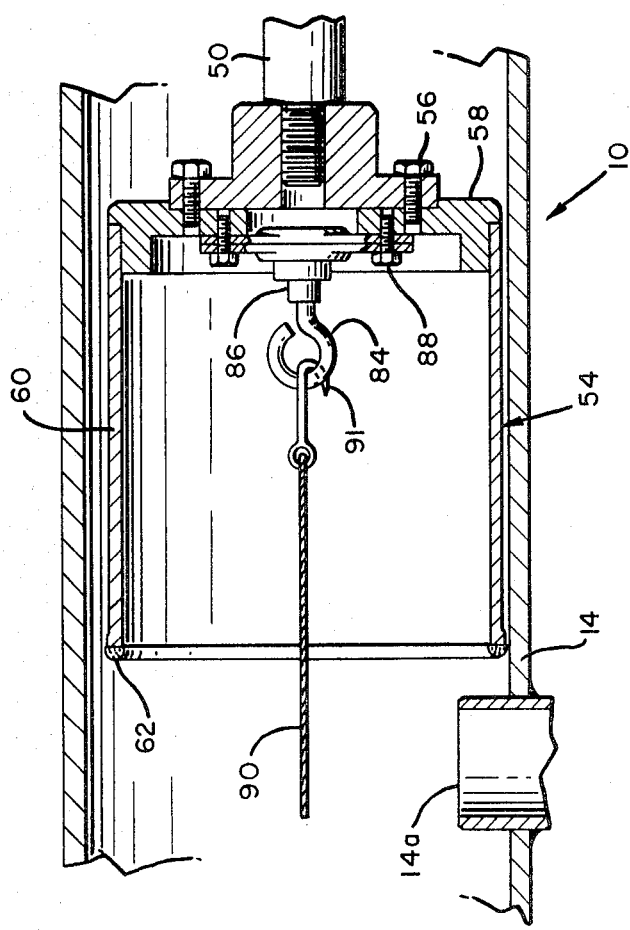
FIG. 1C is a vertical sectional view showing the cutting end of the device embodied in this invention.

The output shaft 48 (FIG. 1B) of the motor 44 is keyed or otherwise secured as by means of setscrews 49 to a drive shaft 50 rotatably carried in a bushing 52 at the output end of the housing 12, and the end of the drive shaft is in turn threaded or otherwise secured to an annular cutting bit 54 (FIG. 1C). The cutting bit may be secured to the output shaft by threading a reduced end thereof into a boss 56 which is secured by capscrews 56 or the like to the bit end wall 58. Welded or otherwise secured around the bit end wall 58 is a sleeve having an annular cutting edge 62 which preferably is a diamond cutter.

Thus, in operation, the rotary motor 44 is driven by pressure fluid entering along the hollow piston rod passageway 28, and it is moved along the housing by means of the pressure piston 24 with the motor being guided linearly by any suitable means, such as an extending screw 64 carried on a slide bushing 65 clamped to the motor 44 and slidable along a longitudinal slot 66 cut in the housing 12. When the pressure is relieved behind the piston, the entire assembly is returned to its initial position by means of a compression spring 68 extending between the motor housing and the end of the main housing.

It will be apparent that the tap cutter may be operated entirely from a single source of pressure fluid. That is, suitable duct means 70 are connected to the first expansible sleeve-locking chamber by fittings 72 and the sleeves are expanded simultaneously by a connecting duct 74. Similarly, the duct 27 introduces pressure fluid behind the piston 26 and a third duct 76 is provided to deliver pressure fluid to the passageway 28 through the hollow rods 26, 34 and 42 to provide the pressure fluid (not shown) which may be operated from the street surface above the manhole. The piston rod 26 extends slidably through the end wall 78 of the cylinder which is provided with suitable packing 80 and a compression screw 82 to seal around the piston rod and insure that it is fluidtight.

Figure 2:
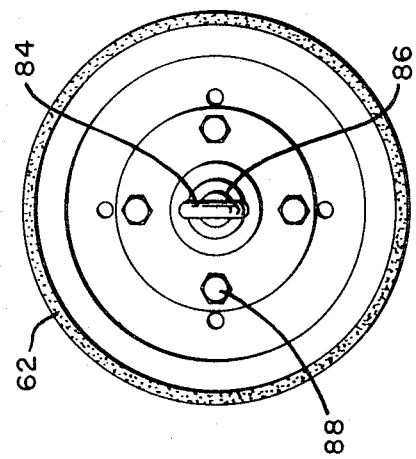
FIG. 2 is an end view of the cutting portion.

As shown in FIG. 1C and 2, a hook device 84 is carried on a swivel member 86 which, in turn, is secured by capscrews 88 or the like to the end wall 58 of the cylindrical cutting member 60 so that the entire housing may be moved along the sewer main by pulling on a cable 90.

In operation, the tool is operated by a two man crew working from adjacent manholes which are spaced regularly along the sewer main approximately 400 feet apart. The cable 90 is passed along the sewer line from one manhole to the next by any suitable means, such as "parachuting" wherein a small parachutelike cloth is secured to the end of the cable so that the flowing stream pulls the cable downstream from a compressor or the like. Of course, other methods may be used to move the cable end to the next manhole, such as floating rods, or any suitable power means. In any event, when the cable is received at the next manhole, the second member of the crew lowers the tap cutter 10 down the manhole and into the sewer main 14. In some instances it is necessary to remove the extending piston rod 34 as by breaking the connection at 40, but otherwise, the entire housing is of such length to fit through any standard manhole and be placed within the sewer main. Then, the second member of the crew merely attaches the hook 91 on the end of the cable to the hook 84 on the swivel mounting 86 in the cutting member 60 and the entire housing 12 is pulled by the first crew member along the sewer main until an obstruction is encountered. At this point, the source of pressure fluid (not shown) is started and pressure fluid is first introduced into the line 70 to inflate the expansible locking means 16 and firmly position the housing in place within the main. Then the fluid is introduced through the line 76 and into the hollow passageway 28 to commence rotation of the motor 44 and, hence, the cutting tool 60. With the cutting tool rotated, the pressure fluid is introduced into the line 29 and into the cylinder 22 to cause the piston 24 to commence movement forwardly, with the motor being guided along the slot 66 against the force of the spring 68. The length of the stroke should be more than adequate to complete severance of the protruding tap line 14a and is preferably long enough to insure cutting away any obstructive material which may be lodged behind it. When the stroke of the piston is completed, the switch 32 carried on the piston rod extension 34 engages the stop member 35 to complete the electrical system 36 and energize the signal light 38 whereby the operator is advised that the operation is completed.

At this time the pressure is relieved to cease operation of the motor and permit the piston to be retracted by the compression spring 68. Then, when pressure is relieved from the expansible locking sleeves 16 the device 10 is pulled forwardly through the main until another protuberance 14a is encountered and the operation is repeated.

While this invention has been described in conjunction with preferred embodiments thereof, it is obvious that modifications and changes therein may be made by those skilled in the art without departing from the spirit and scope of this invention as defined by the claims appended hereto.

I claim:
1. A device for removing obstacles such as tap lines extending into a main conduit, said device comprising:
  a frame movable axially within a conduit,
  means for locking the frame in selected position within such conduit, said means comprising a chamber for receiving fluid pressure, said chamber including an outer expansible sleeve member responsive to fluid pressure introduced into the chamber to expand radially outwardly, to contact the inner surface of such conduit and to lock the frame in place,
  a cutting member rotatable on said frame and adapted to cut obstructions protruding radially inwardly from the inner surface of such conduit,
  means for rotating said cutting member,
  means for introducing fluid under pressure into said chamber, and
  means for moving said cutting member linearly on said frame and axially of said conduit.
2. The device defined by claim 1 wherein,
  said rotating means comprises a rotary pressure fluid-operated motor, and
  said linear moving means comprises:
    a cylinder on said frame,
    a piston slidably carried in said cylinder and connected to said rotary motor and including,
      duct means connecting said rotary motor and said piston to a source of pressure fluid.
3. The device defined by claim 1 wherein said locking means comprises:
  A fluidtight chamber on said frame,
  a flexible sleeve forming the outer wall of said chamber,
  said sleeve being expansible into firm frictional engagement with the interior wall of a fluid conduit, and including
    duct means connecting said chamber to a source of pressure fluid,
  said rotating means comprises:
    a rotary pressure fluid-operated motor, and
  said linear moving means comprises:
    a cylinder on said frame,
    a piston slidably carried in said cylinder and connected to said rotary motor, and including:
      duct means connecting said rotary motor and said piston to a source of pressure fluid.